(12) United States Patent
Kim et al.

(10) Patent No.: US 11,558,559 B2
(45) Date of Patent: Jan. 17, 2023

(54) SYSTEM AND METHOD WITH VEHICLE CAMERA

(71) Applicant: SAMSUNG ELECTRO-MECHANICS CO., LTD., Suwon-si (KR)

(72) Inventors: Tae Hoon Kim, Suwon-si (KR); Joon Seok Chae, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/075,776

(22) Filed: Oct. 21, 2020

(65) Prior Publication Data

US 2021/0344847 A1  Nov. 4, 2021

(30) Foreign Application Priority Data

Apr. 29, 2020  (KR) .................. 10-2020-0052438

(51) Int. Cl.
  *H04N 5/247*  (2006.01)
  *H04N 5/225*  (2006.01)
  *H04N 5/232*  (2006.01)
  *B60R 1/00*  (2022.01)

(52) U.S. Cl.
  CPC ............. *H04N 5/247* (2013.01); *B60R 1/00* (2013.01); *H04N 5/2259* (2013.01); *H04N 5/23216* (2013.01); *H04N 5/23238* (2013.01); *H04N 5/23245* (2013.01); *B60R 2300/105* (2013.01); *B60R 2300/20* (2013.01); *B60R 2300/607* (2013.01); *B60R 2300/802* (2013.01)

(58) Field of Classification Search
  CPC ................................... H04N 5/247
  USPC ......................................... 348/148
  See application file for complete search history.

(56) References Cited

U.S. PATENT DOCUMENTS

| 2015/0254825 | A1* | 9/2015 | Zhang | G06T 3/4038 382/284 |
| 2015/0274074 | A1* | 10/2015 | Petrillo | G01C 21/3697 701/36 |
| 2017/0045890 | A1* | 2/2017 | Gurin | H04N 7/181 |
| 2017/0297493 | A1* | 10/2017 | Gillespey | B60R 1/00 |
| 2018/0338117 | A1 | 11/2018 | Park et al. | |

(Continued)

FOREIGN PATENT DOCUMENTS

| CN | 110853185 A | 2/2020 |
| KR | 20-1998-0028595 U | 8/1998 |
| KR | 10-2007-0007225 A | 1/2007 |

(Continued)

OTHER PUBLICATIONS

Korean Office Action dated Feb. 17, 2021 in counterpart Korean Patent Application No. 10-2020-0052438 (5 pages in English)(4 pages in Korean).

(Continued)

*Primary Examiner* — Daniel T Tekle
(74) *Attorney, Agent, or Firm* — NSIP Law

(57) ABSTRACT

A vehicle camera system includes: an around view camera device including a front camera, a left camera, a right camera, and a rear camera, and configured to vary a field of view of one or more of the cameras in response to a control signal; and a control device configured to control the field of view by generating the control signal, in response to an operating mode.

17 Claims, 5 Drawing Sheets

(56) References Cited

U.S. PATENT DOCUMENTS

2019/0048559 A1* 2/2019 Olsen ..................... B60R 11/04
2020/0192080 A1* 6/2020 Karam ............... G02B 27/0068

FOREIGN PATENT DOCUMENTS

| KR | 10-1763386 B1 | 8/2017 |
| KR | 10-1778624 B1 | 9/2017 |
| WO | WO 2019/226647 A1 | 11/2019 |

OTHER PUBLICATIONS

Chinese Office Action dated Nov. 15, 2022, in counterpart Chinese Patent Application No. 202011549997.8 (16 pages in English, 15 pages in Chinese).

* cited by examiner

SYSTEM AND METHOD WITH VEHICLE CAMERA

CROSS-REFERENCE TO RELATED APPLICATIONS

This application claims the benefit under 35 USC § 119(a) of Korean Patent Application No. 10-2020-0052438 filed on Apr. 29, 2020 in the Korean Intellectual Property Office, the entire disclosure of which is incorporated herein by reference for all purposes.

BACKGROUND

1. Field

The following description relates to a system and method with a vehicle camera.

2. Description of Related Art

An around view system, including cameras installed in a front, rear, left, and right of a vehicle, may assist a driver to conveniently park the vehicle.

Such around view system may provide a top view or a bird eye view of surrounding obstacles or images by synthesizing four images around the vehicle in 2D or 3D.

The around view system may be interlocked with other sensors installed in the vehicle, such as radar, lidar, and ultrasonic sensors, so that the vehicle can automatically park itself without driver input.

The number of cameras and sensors that may be used for various applications of an advanced driver assistance system (ADAS) and/or automatic driving system is continuously increasing.

In addition, a field of view (FOV) of a camera lens of a camera used in the ADAS and/or automatic driving system may be designed and manufactured differently according to each application of the ADAS and/or automatic driving system.

Accordingly, when the FOV of the lens is designed and manufactured differently according to the application, a differently-designed camera may be installed for each application, and as the number of cameras used for the various applications increases, the number of differently-designed cameras that are installed increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle camera system includes: an around view camera device including a front camera, a left camera, a right camera, and a rear camera, and configured to vary a field of view of one or more of the cameras in response to a control signal; and a control device configured to control the field of view by generating the control signal, in response to an operating mode.

Each of the front camera, the left camera, the right camera, and the rear camera may be a variable moving lens camera.

Each of the front camera, the left camera, the right camera, and the rear camera may be a variable liquid lens camera.

For the controlling of the field of view, the control device may be configured to control the field of view to be a field of view corresponding to an around view mode, in response to the operating mode being the around view mode.

For the controlling of the field of view, the control device may be configured to control the field of view to be a field of view corresponding to a driving mode, in response to the operating mode being the driving mode.

For the controlling of the field of view, the control device may be configured to control the field of view to be a field of view corresponding to a black box mode, in response to the operating mode being the black box mode.

For the controlling of the field of view, the control device may be configured to control the field of view to be a field of view corresponding to a mirror mode, in response to the operating mode being the mirror mode.

The system may include either one or both of a first input device and a second input device configured to input the operating mode to the control device.

For the controlling of the field of view, the control device may be configured to: change the operating mode based on a determined driving speed, in response to a change condition of the operating mode being satisfied; and control the field of view to be a field of view corresponding to the changed operating mode.

In another general aspect, a processor-implemented vehicle camera method includes: receiving an operating mode signal; determining whether there is a change in an operating mode based on the operating mode signal; maintaining the operating mode in response to the operating mode not being changed; and changing the operating mode in response to the operating mode being changed, and controlling a change in a field of view of one or more cameras to be a field of view corresponding to the changed operating mode, wherein the one or more cameras include a front camera, a left camera, a right camera, and a rear camera with variable fields of view.

Each of the front camera, the left camera, the right camera, and the rear camera may be either one of a variable moving lens camera and a variable liquid lens camera.

In response to the changed operating mode being an around view mode, the controlling may include controlling the field of view to be a field of view corresponding to the around view mode.

In response to the changed operating mode being a driving mode, the controlling may include controlling the field of view to be a field of view corresponding to the driving mode.

In response to the changed operating mode being a black box mode, the controlling may include controlling the field of view to be a field of view corresponding to the black box mode.

In response to the changed operating mode being a mirror mode, the controlling may include controlling the field of view to be a field of view corresponding to the mirror mode.

The determining of whether there is a change in the operating mode may be based on a received driving speed, and the changing of the operating mode and the controlling of the change in the field of view to be the field of view corresponding to the changed operating mode may be in response to a change condition of the operating mode being satisfied.

In another general aspect, a vehicle includes: an input device configured to receive an input from a user of the vehicle; one or more cameras disposed on a periphery of the vehicle; a control device configured determine an operating mode of the one or more cameras based on the input received from the user, and control a field view of the one or more cameras based on the determined operating mode; and a display configured to output information corresponding to the determined operating mode.

The control device may be configured to: for the determining of the operating mode, determine the operating mode to be an around view mode; and for the controlling of the field view, control the field of view to be 180 degrees or more, in response to the operating mode being the around view mode.

The one or more cameras may be configured to capture one or more images with the 180 degrees or more field of view, the control device may be configured to generate a bird eye view image based on the one or more images, and the display may be configured to output the bird eye view image.

The control device may be configured to: for the determining of the operating mode, determine the operating mode to be a mirror mode; and for the controlling of the field view, control the field of view to be less than 180 degrees, in response to the operating mode being the mirror mode.

The one or more cameras may be configured to capture one or more images with the less than 180 degrees field of view, and the control device may be configured to generate a vehicle mirror image based on the one or more images, and the display may be configured to output the vehicle mirror image.

Other features and aspects will be apparent from the following detailed description, the drawings, and the claims.

Figure 1:
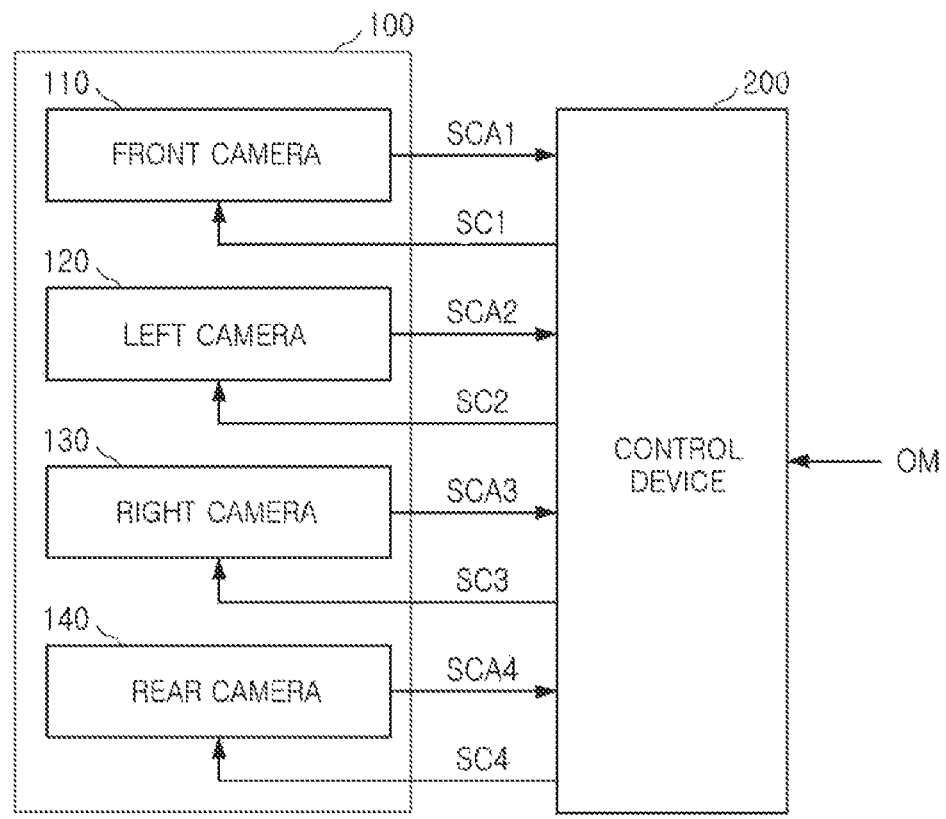
FIG. 1 is a view of a vehicle camera system according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes illustrated in the drawings may occur. Thus, the examples described herein are not limited to the specific shapes illustrated in the drawings, but include changes in shape that occur during manufacturing The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (for example, as to what an example or embodiment may include or implement) means that at least one example or embodiment exists where such a feature is included or implemented, while all examples are not limited thereto.

FIG. 1 is a view of a vehicle camera system according to one or more embodiments.

Referring to FIG. 1, a vehicle camera system according to an embodiment of the present disclosure may include an around view camera device 100 and a control device 200.

The around view camera device 100 may include a front camera 110, a left camera 120, a right camera 130, and a rear camera 140 of which a field of view (FOV) is varied in response to control signals SCs (SC1 to SC4).

The control device 200 may control or change the field of view of the lens of a camera among the front camera 110, the left camera 120, the right camera 130, and the rear camera 130, in response to an input operating mode (OM). The control device 200 may include, or be representative of, one or more processors.

As an example, when the around view camera device 100 operates in an around view mode, each camera of the around view camera device 100 may advantageously employ a wide-angle camera having a field of view (FOV) of the lens of 180 degrees or more, in order to employ and implement a minimum number of cameras to obtain a 360-degree image around the vehicle. In this case, the control device 200 may create a single image by cutting or cropping each constant area image input from the around view camera device 100 and combining the cut or cropped images, to generate an around view image. The around view image may be a top view or a bird eye view of obstacles or images surrounding the vehicle.

Meanwhile, when each camera of the around view camera device 100 operates in an around view mode (e.g., a wide-angle mode) having a field of view (FOV) of 180 degrees or more, a distortion phenomenon of the lens of each camera may be so severe that an object in a central portion may appear relatively small, and an object in an outer portion may have low perception due to distortion. Thus, when operated in a different operating mode (usage) than the around view, the field of view of the lens must be changed appropriately for the operating mode. For example, the control device 200 may control or change a field of view of one or more of the cameras 110, 120, 130 and 140 to be less than 180 degrees when the one or more of the cameras 110, 120, 130 and 140 operate in the different operating mode than the around view mode.

For each drawing of the present disclosure, unnecessary duplicate descriptions may be omitted for the same reference numerals and components having the same function, and details of possible differences for each drawing may be described.

Figure 2:
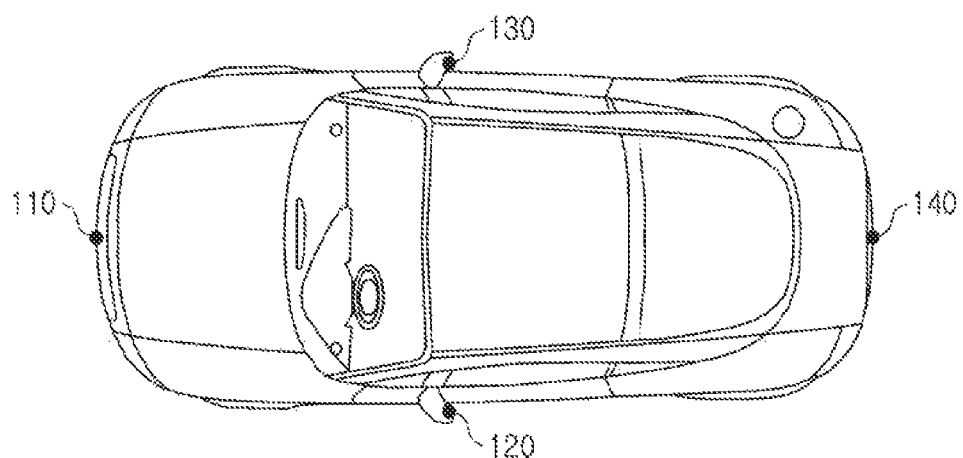
FIG. 2 is a view of an installation of an around view camera according to one or more embodiments.

FIG. 2 is a view of installing an around view camera according to one or more embodiments.

Referring to FIG. 2, the front camera 110, the left camera 120, the right camera 130, and the rear camera 140 included in the around view camera device 100 may be respectively installed on a front side, a left side, a right side, and a rear side of a vehicle.

For example, the front camera 110 may be installed on the front side to capture an area in front of the vehicle, the left camera 120 may be installed on the left side to capture an area to the left and to a left rear side of the vehicle, the right camera 130 may be installed on the right side to capture an area to the right side and to a right rear side of the vehicle, and the rear camera 140 may be installed on the rear side to capture an area rear of the vehicle.

Figure 3:
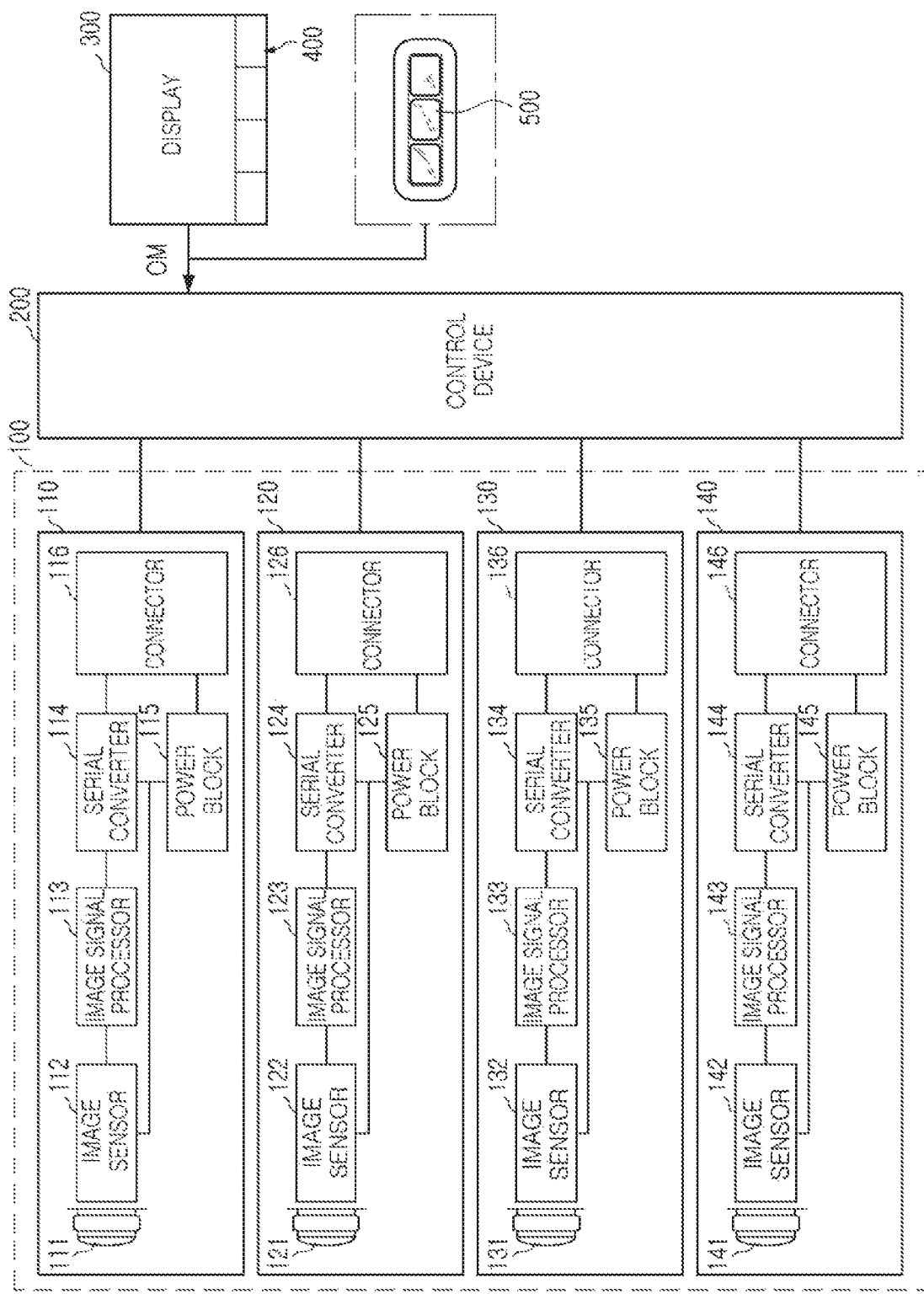
FIG. 3 is a view of a vehicle camera system according to one or more embodiments.

FIG. 3 is a view of a vehicle camera system (e.g., the vehicle camera system of FIG. 1) according to one or more embodiments.

Referring to FIGS. 1 and 3, the vehicle camera system may further include a display 300, a first input device 400, and a second input device 500.

The display 300 may screen-output any one or any combination of any two or more of vehicle state information, driving information, sensing information, images generated by the around view camera device 100, and information corresponding to the operating mode.

The first input device 400 may receive touch input information from a user through the display 300. The second input device 500 may receive button input information from the user.

At least one of the first input device 400 and the second input device 500 may input the operating mode OM to the control device 200.

For example, the around view mode and/or a different operating mode may be selected by a user through the first input device 400 and/or the second input device 500.

For example, the operating mode OM may be one of an around view mode, a driving mode, a black box mode, and a mirror mode, but is not limited thereto.

In one example, when the operating mode OM is an around view mode, the control device 200 may control the camera device with a field of view (FOV) corresponding to the around view mode.

When the operating mode OM is a driving mode, the control device 200 may control the camera device with a field of view (FOV) corresponding to the driving mode. When the operating mode OM is a black box mode, the control device 200 may control the camera device with a field of view (FOV) corresponding to the black box mode.

When the front camera 110, the left camera 120, the right camera 130, and the rear camera 140 operate in a driving mode for front view or a black box (DVR) mode, the cameras may be adjusted to have a field of view determined for the driving mode, such that a distance, an object, and/or a number plate captured by one or more of the cameras may be easily recognized by a user without the distortion phenomenon of the wide-angle lens.

When the operating mode OM is a mirror mode, the control device 200 may control a corresponding camera device with a field of view (FOV) corresponding to the mirror mode.

For example, when the left camera 120 and the right camera 130 included in the around view camera device 100 are in a mirror mode, the cameras may be adjusted to have a field of view determined for the mirror mode, such that a cropped and enlarged region of an image captured by the left camera 120 or the right camera 130 utilized for the mirror mode (e.g., as a left and/or right external E-mirror) has a sufficiently high resolution and a sufficiently wide viewing angle. In an example, the field of view determined for the mirror mode may be less than an 180 degree or more field of view determined for the around view mode.

The front camera 110 of the around view camera device 100 may include a variable lens module 111, an image sensor 112, an image signal processor 113, a serial converter 114, a power block 115, and a connector 116.

The variable lens module 111 may include a plurality of lenses therein, and a field of view of a portion of the plurality of lenses may be changed in response to a first control signal SC1, and an image may be captured with the changed field of view.

The image sensor 112 may generate an image signal by sensing an image through the variable lens module 111.

The image signal processor 113 may perform processing such as image correction, stabilization, and the like, on the image signal received from the image sensor 112.

The serial converter 114 may convert a parallel-type image signal received from the image signal processor 113 into a serial-type image signal.

The power block 115 may supply power to each of the variable lens module 111, image sensor 112, image signal processor 113, serial converter 114, and connector 116.

The connector 116 may be connected to the control device 200, transmit a signal output from the serial converter 114 to the control device 200, and may transmit the first control signal SC1 from the control device 200 to the variable lens module 111.

The left camera 120 of the around view camera device 100 may include a variable lens module 121, an image sensor 122, an image signal processor 123, a serial converter 124, a power block 125, and a connector 126.

The variable lens module 121 may include a plurality of lenses therein, and a field of view of a portion of the plurality of lenses may be changed in response to a second control signal SC2, and an image may be captured with the changed field of view.

The image sensor 122 may generate an image signal by sensing an image through the variable lens module 121.

The image signal processor 123 may perform processing such as image correction, stabilization, and the like, on the image signal received from the image sensor 122.

The serial converter 124 may convert a parallel-type image signal received from the image signal processor 123 into a serial-type video signal.

The power block 125 may supply power to each of the variable lens module 121, image sensor 122, image signal processor 123, serial converter 124, and connector 126.

The connector 126 may be connected to the control device 200, transmit a signal output from the serial converter 124 to the control device 200, and may transmit the second control signal SC2 from the control device 200 to the variable lens module 121.

The right camera 130 of the around view camera device 100 includes a variable lens module 131, an image sensor 132, an image signal processor 133, a serial converter 134, a power block 135, and a connector 136.

The variable lens module 131 may include a plurality of lenses therein, and a field of view of a portion of the plurality of lenses may be changed in response to a third control signal SC3, and an image may be captured with the changed field of view.

The image sensor 132 may generate an image signal by sensing an image through the variable lens module 131.

The image signal processor 133 may perform processing such as image correction, stabilization, and the like, on the image signal received from the image sensor 132.

The serial converter 134 may convert a parallel-type image signal received from the image signal processor 133 into a serial-type video signal.

The power block 135 may supply power to the each of the variable lens module 131, image sensor 132, image signal processor 133, serial converter 134, and connector 136.

The connector 136 may be connected to the control device 200, transmit a signal output from the serial converter 134 to the control device 200, and may transmit the third control signal SC3 from the control device 200 to the variable lens module 131.

The rear camera 140 of the around view camera device 100 may include a variable lens module 141, an image sensor 142, an image signal processor 143, a serial converter 144, a power block 145, and a connector 146.

The variable lens module 141 may include a plurality of lenses therein, and a field of view of a portion of the plurality of lenses may be changed in response to a fourth control signal SC4, and an image may be captured with the changed angle of view.

The image sensor 142 may generate an image signal by sensing an image through the variable lens module 141.

The image signal processor 143 may perform processing such as image correction, stabilization, and the like, on the image signal received from the image sensor 142.

The serial converter 144 may convert a parallel-type image signal received from the image signal processor 143 into a serial-type video signal.

The power block 145 may supply power to each of the variable lens module 141, image sensor 142, image signal processor 143, serial converter 144, and connector 146.

The connector 146 may be connected to the control device 200, transmit a signal output from the serial converter 144 to the control device 200, and may transmit the fourth control signal SC4 from the control device 200 to the variable lens module 141.

Meanwhile, each of the serial converters 114, 124, 134, and 144 may be a camera data communication portion, but is not limited thereto.

Figure 4:
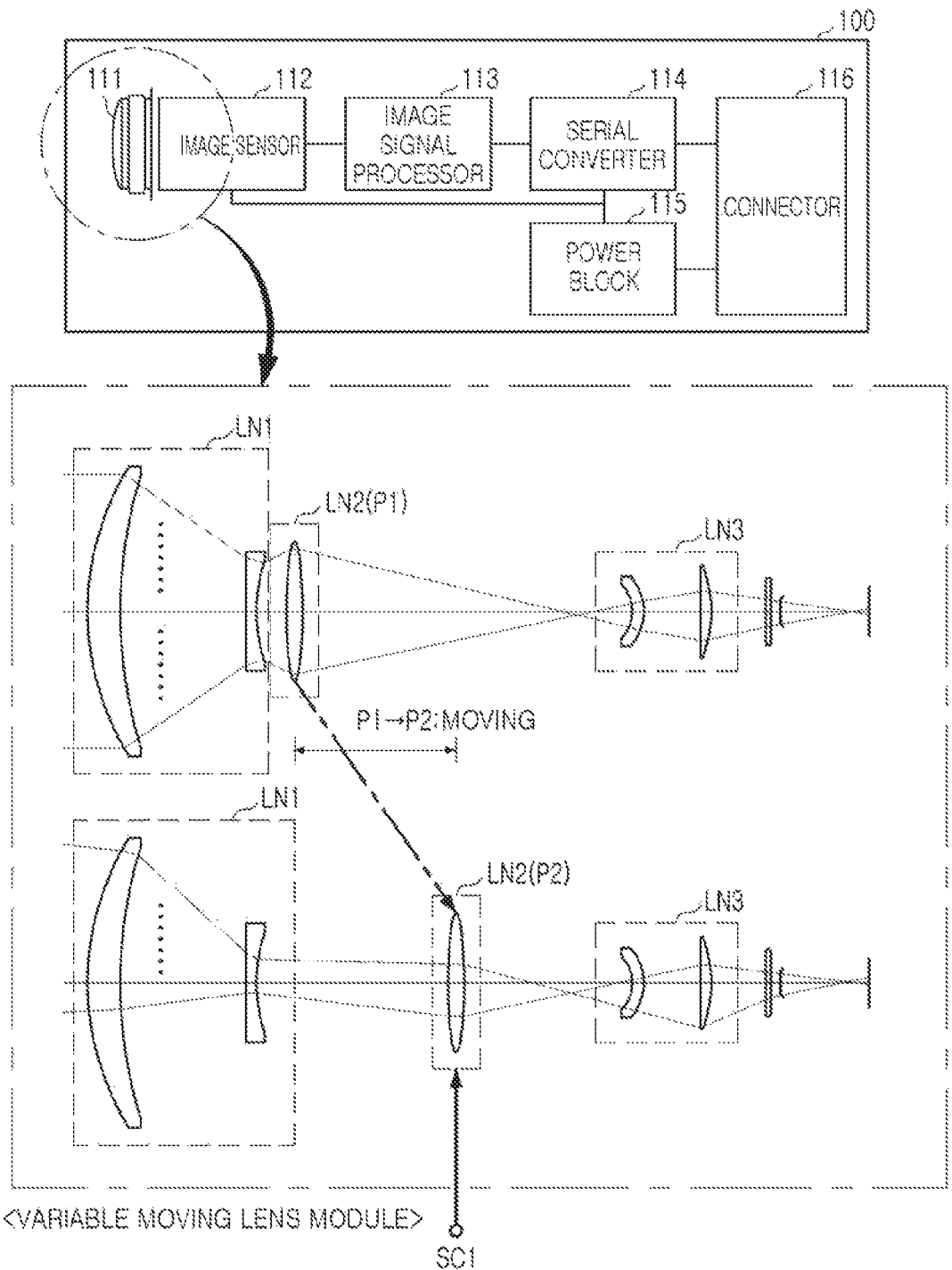
FIG. 4 is a view of a variable lens module according to one or more embodiments.

FIG. 4 is a view of a variable lens module according to one or more embodiments.

Referring to FIG. 4, each of the front camera 110, the left camera 120, the right camera 130, and the rear camera 140 may be a variable moving lens camera. For example, the variable lens modules 111, 121, 131, and 141 of FIG. 3 may include a variable moving lens module as shown in FIG. 4, though examples are not limited thereto.

As an example, as illustrated in FIG. 4, the variable moving lens camera may include the variable moving lens module including a first lens portion LN1, a second lens portion LN2, and a third lens portion LN3.

The first lens portion LN1 and the third lens portion LN3 may be fixedly installed.

The second lens portion LN2 may be moved between a first position P1 and a second position P2 in response to the control signal SC1, and accordingly, the field of view of the lens module may be adjusted.

The variable moving lens camera illustrated in FIG. 4 is not limited to one example.

Figure 5:
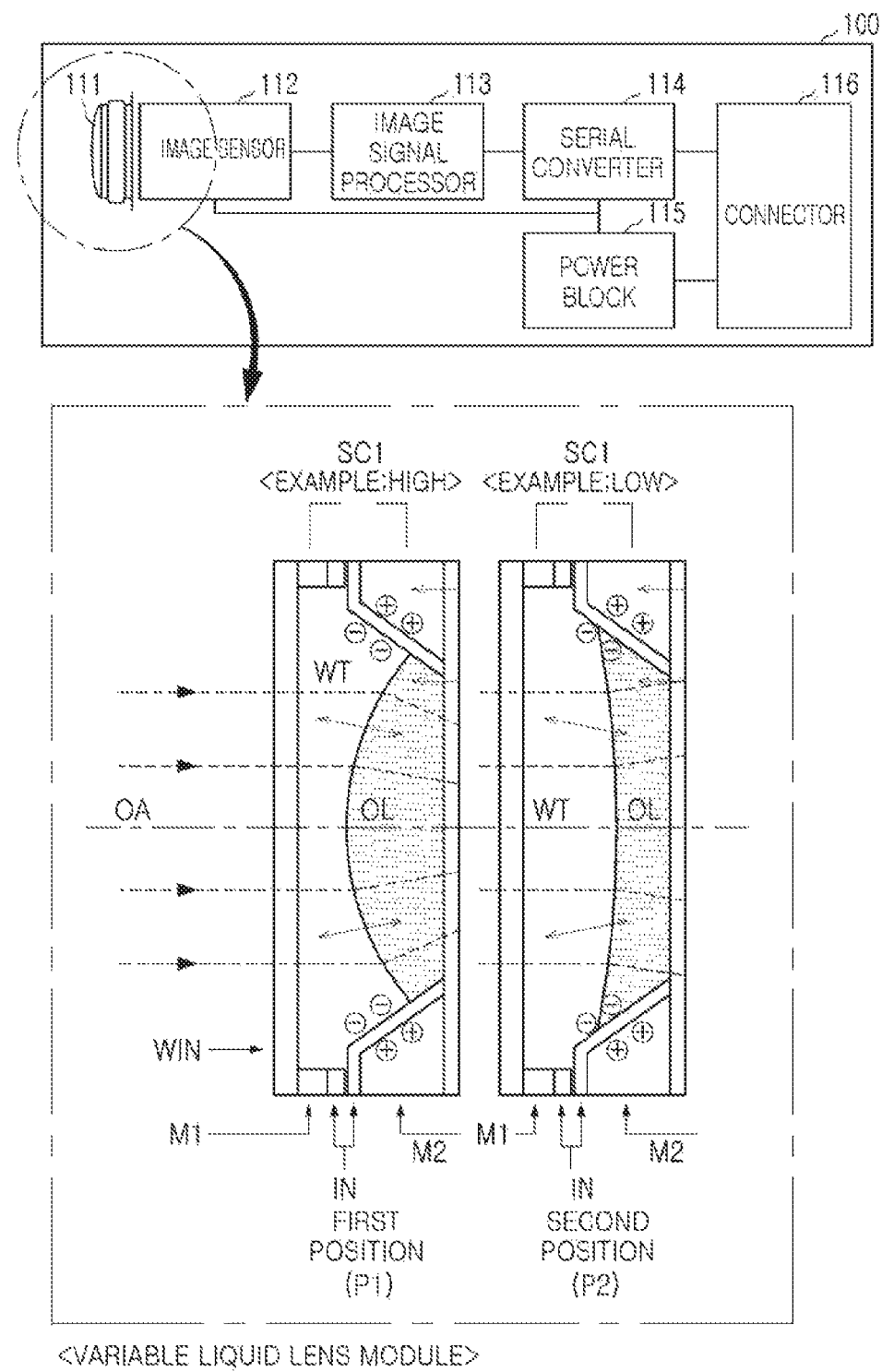
FIG. 5 is a view of a variable lens module according to one or more embodiments.

FIG. 5 is a view of a variable lens module according to one or more embodiments.

Referring to FIG. 5, each of the front camera 110, the left camera 120, the right camera 130, and the rear camera 140 may be a variable liquid lens camera. For example, the variable lens modules 111, 121, 131, and 141 of FIG. 3 may include a variable liquid lens module as shown in FIG. 5, though examples are not limited thereto.

As an example, the variable liquid lens camera may include the variable liquid lens module, and as illustrated in FIG. 5. The variable liquid lens module may include an insulator IN disposed between a window WIN on front and rear surfaces, and metals M1 and M2 on side surfaces An inner space formed by the insulator IN, window WIN, and metals M1 and M2 may include fluids water WT and oil OL separated from each other.

In this case, the shape of the liquid lens may be changed according to the control signal SC1 applied to the metals M1 and M2, so that the field of view of the lens may be adjusted.

The variable moving lens camera illustrated in FIG. 5 is not limited to one example.

Referring to FIGS. 4 and 5, for example, each of the front camera 110, the left camera 120, the right camera 130, and the rear camera 140 may be a multi-field of view camera.

Here, as illustrated in FIG. 4, the multi-field of view camera may be a variable moving lens camera having a multi-field of view (FOV) lens that can vary the field of view (FOV) with an actuator.

In addition, as illustrated in FIG. 5, it may be a variable liquid camera having a liquid lens module.

As such, the multi-field of view camera may be a camera having various multi-field of view (FOV) lenses.

Meanwhile, in an example, when a change in the operating mode OM based on a received driving speed is determined, and a change condition of the operating mode OM is satisfied, the control device 200 may change the operating mode OM, and may control the camera device with a field of view FOV corresponding to the changed operating mode OM. For example, the control device 200 may change the operating mode OM based on a determined driving speed, when a change condition of the operating mode OM is satisfied, and control the field of view to be a field of view corresponding to the changed operating mode OM.

In addition, in an example, the variable lens camera that can change the field of view is not limited to the variable moving lens or variable liquid lens exemplified in the present disclosure.

Hereinafter, with reference to FIG. 6, an operating method of a vehicle camera system will be described. The aforementioned description of the vehicle camera system with reference to FIGS. 1-5 and the operating method of the vehicle camera system described below with reference to FIG. 6 may be applied to each other, unless otherwise specified, though examples are not limited thereto. That is, the description made with reference to FIGS. 1 to 5 may be applied, and accordingly, in the description of the operating method of the vehicle camera system, detailed overlapping descriptions may be omitted. That is, in addition to the description of FIG. 6 below, the descriptions of FIGS. 1-5 are also applicable to FIG. 6, and are incorporated herein by reference. Thus, the above description may not be repeated here.

Figure 6:
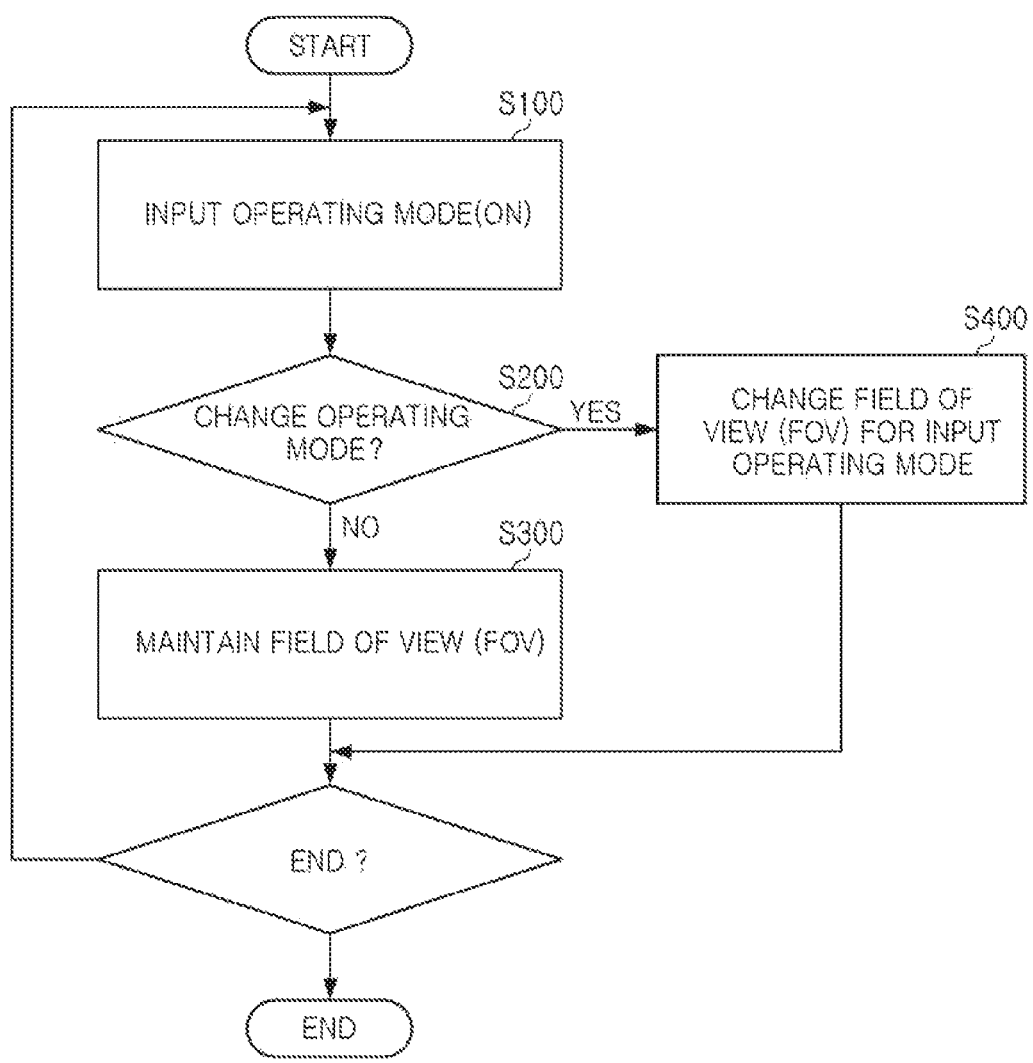
FIG. 6 is a flowchart illustrating an operating method of a vehicle camera system according to one or more embodiments.

FIG. 6 is a flowchart illustrating an operating method of a vehicle camera system according to one or more embodiments.

Referring to FIGS. 1 to 6, an operating method of a vehicle camera system may be performed. The steps in FIG. 6 may be performed in the sequence and manner as shown, although the order of some steps may be changed or some of the steps omitted without departing from the spirit and scope of the illustrative examples described. Certain steps shown in FIG. 6 may be performed in parallel or concurrently.

In a step S100, the control device 200 may receive an operating mode (OM) signal.

In a step S200, the control device 200 may determine a change in the operating mode based on the operating mode (OM) signal (e.g., based on the operating mode (OM) signal received in step S100).

In a step S300, the control device 200 may maintain the operating mode when the operating mode is not changed (e.g., when it is determined in step S200 that the operating mode is not changed).

In a step S400, the control device 200 may change the operating mode for the camera device when the operating mode is changed (e.g., when it is determined in step S200 that the operating mode is changed), and control a change in the field of view (FOV) corresponding to the operating mode.

For example, as illustrated in FIGS. 4 and 5, each of the front camera 110, the left camera 120, the right camera 130, and the rear camera 140 may be a variable moving lens camera or a variable liquid lens camera.

For example, when the operating mode OM is an around view mode, the control device 200 may control the corresponding camera device with a field of view (FOV) corresponding to the around view mode.

For example, when the operating mode OM is a driving mode, the control device 200 may control the corresponding camera device with a field of view (FOV) corresponding to the driving mode.

For example, when the operating mode OM is a black box mode, the control device 200 may control the corresponding camera device with a field of view (FOV) corresponding to the black box mode.

For example, when the operating mode OM is a mirror mode, the control device 200 may control the corresponding camera device with a field of view (FOV) corresponding to the around view mode.

On the other hand, when the change in the operating mode OM is determined based on the received driving speed, and a change condition of the operating mode OM is satisfied, the control device may change the operating mode OM, and may control the camera device with the field of view (FOV) corresponding to the changed operating mode OM.

The around view camera devices, control devices, displays, first input devices, second input devices, front cameras, left cameras, right cameras, rear cameras, variable lens modules, image sensors, image signal processors, serial converters, power blocks, connectors, around view camera device 100, control device 200, display 300, first input device 400, second input device 500, front camera 110, left camera 120, right camera 130, rear camera 140, variable lens module 111, image sensor 112, image signal processor 113, serial converter 114, power block 115, connector 116, variable lens module 121, image sensor 122, image signal processor 123, serial converter 124, power block 125, connector 126, variable lens module 131, image sensor 132, image signal processor 133, serial converter 134, power block 135, connector 136, variable lens module 141, image sensor 142, image signal processor 143, serial converter 144, power block 145, connector 146, apparatuses, units, modules, devices, and other components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed:

1. A vehicle camera system, comprising:
  a camera device including a front camera, a left camera, a right camera, and a rear camera, and configured to vary a field of view of one or more of the front camera, the left camera, the right camera, and the rear camera in response to a control signal; and a control device configured to control the field of view by generating the control signal based on a determined driving speed of a vehicle, in response to an operating mode, wherein the one or more of the front camera, the left camera, the right camera, and the rear camera is a variable moving lens camera including a movable lens portion configured to move in response to the control signal to vary the field of view, wherein, for the controlling of the field of view, the control device is further configured to:

change the operating mode based on the determined driving speed, in response to a change condition of the operating mode being satisfied; and control the field of view to be a field of view corresponding to the changed operating mode.

2. The system of claim 1, wherein, for the controlling of the field of view, the control device is configured to control the field of view to be a field of view corresponding to an around view mode, in response to the operating mode being the around view mode.

3. The system of claim 1, wherein, for the controlling of the field of view, the control device is configured to control the field of view to be a field of view corresponding to a driving mode, in response to the operating mode being the driving mode.

4. The system of claim 1, wherein, for the controlling of the field of view, the control device is configured to control the field of view to be a field of view corresponding to a black box mode, in response to the operating mode being the black box mode.

5. The system of claim 1, wherein, for the controlling of the field of view, the control device is configured to control the field of view to be a field of view corresponding to a mirror mode, in response to the operating mode being the mirror mode.

6. The system of claim 1, further comprising either one or both of a first input device and a second input device configured to input the operating mode to the control device.

7. A processor-implemented vehicle camera method, comprising:

receiving an operating mode signal;

determining whether there is a change in an operating mode based on the operating mode signal;

maintaining the operating mode in response to the operating mode not being changed; and changing the operating mode in response to the operating mode being changed, and controlling a change in a field of view of one or more cameras among a front camera, a left camera, a right camera, and a rear camera to be a field of view corresponding to the changed operating mode based on a received driving speed of a vehicle, wherein each of the one or more cameras is a variable moving lens camera including a movable lens portion configured to move in response to the operating mode being changed to change the field of view, and wherein, for the controlling of the field of view, the control device is further configured to:

change the operating mode based on the determined driving speed, in response to a change condition of the operating mode being satisfied; and control the field of view to be a field of view corresponding to the changed operating mode.

8. The method of claim 7, wherein, in response to the changed operating mode being an around view mode, the controlling comprises controlling the field of view to be a field of view corresponding to the around view mode.

9. The method of claim 7, wherein, in response to the changed operating mode being a driving mode, the controlling comprises controlling the field of view to be a field of view corresponding to the driving mode.

10. The method of claim 7, wherein, in response to the changed operating mode being a black box mode, the controlling comprises controlling the field of view to be a field of view corresponding to the black box mode.

11. The method of claim 7, wherein, in response to the changed operating mode being a mirror mode, the controlling comprises controlling the field of view to be a field of view corresponding to the mirror mode.

12. The method of claim 7, wherein the determining of whether there is a change in the operating mode is based on the received driving speed, and the changing of the operating mode and the controlling of the change in the field of view to be the field of view corresponding to the changed operating mode is in response to a change condition of the operating mode being satisfied.

13. A vehicle, comprising:

an input device configured to receive an input from a user of the vehicle;

one or more cameras disposed on a periphery of the vehicle;

a control device configured to determine an operating mode of the one or more cameras based on the input received from the user, and control a field view of the one or more cameras based on the determined operating mode dependent on a driving speed of the vehicle; and a display configured to output information corresponding to the determined operating mode, wherein each of the one or more cameras is a variable moving lens camera including a movable lens portion configured to move to change the field of view, based on the control of the field of view, and wherein, for the controlling of the field of view, the control device is further configured to:

change the operating mode based on the determined driving speed, in response to a change condition of the operating mode being satisfied; and control the field of view to be a field of view corresponding to the changed operating mode.

14. The vehicle of claim 13, wherein the control device is configured to:

for the determining of the operating mode, determine the operating mode to be an around view mode; and for the controlling of the field view, control the field of view to be 180 degrees or more, in response to the operating mode being the around view mode.

15. The vehicle of claim 14, wherein the one or more cameras are configured to capture one or more images with the 180 degrees or more field of view, the control device is configured to generate a bird eye view image based on the one or more images, and the display is configured to output the bird eye view image.

16. The vehicle of claim 13, wherein the control device is configured to:

for the determining of the operating mode, determine the operating mode to be a mirror mode; and for the controlling of the field view, control the field of view to be less than 180 degrees, in response to the operating mode being the mirror mode.

17. The vehicle of claim 16, wherein the one or more cameras are configured to capture one or more images with the less than 180 degrees field of view, the control device is configured to generate a vehicle mirror image based on the one or more images, and the display is configured to output the vehicle mirror image.

\* \* \* \* \*